US010679361B2

(12) United States Patent
Karnad

(10) Patent No.: US 10,679,361 B2
(45) Date of Patent: Jun. 9, 2020

(54) MULTI-VIEW ROTOSCOPE CONTOUR PROPAGATION

(71) Applicant: Google LLC

(72) Inventor: Nikhil Karnad, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 97 days.

(21) Appl. No.: 15/831,770

(22) Filed: Dec. 5, 2017

(65) Prior Publication Data

US 2018/0158198 A1 Jun. 7, 2018

Related U.S. Application Data

(60) Provisional application No. 62/430,048, filed on Dec. 5, 2016.

(51) Int. Cl.
G06T 7/292 (2017.01)
H04N 19/157 (2014.01)
(Continued)

(52) U.S. Cl.
CPC ............... G06T 7/292 (2017.01); G06T 7/12 (2017.01); G06T 7/13 (2017.01); G06T 7/174 (2017.01);
(Continued)

(58) Field of Classification Search
None
See application file for complete search history.

(56) References Cited

U.S. PATENT DOCUMENTS 725,567 A 4/1903 Ives
4,383,170 A 5/1983 Takagi et al.
(Continued)

FOREIGN PATENT DOCUMENTS

CN 101226292 7/2008
CN 101309359 11/2008
(Continued)

OTHER PUBLICATIONS

Sinha, Sudipta N., Marc Pollefeys, and Leonard McMillan. "Camera network calibration from dynamic silhouettes." Proceedings of the 2004 IEEE Computer Society Conference on Computer Vision and Pattern Recognition, 2004. CVPR 2004 . . . vol. 1. IEEE, (Year: 2004).*

(Continued)

Primary Examiner — Sarah Le

(57) ABSTRACT

A video stream may be captured, and may have a plurality of frames including at least a first frame and a second frame. Each of the frames may have a plurality of views obtained from viewpoints that are offset from each other. A source contour, associated with a source view of the first frame, may be retrieved. Camera parameters, associated with the image capture device used to capture the video stream, may also be retrieved. The camera parameters may include a first offset between the source view and a destination view of the first frame. At least the first offset may be used to project the source contour to the destination view to generate a destination contour associated with the destination view.

32 Claims, 8 Drawing Sheets

(51) Int. Cl.
  *G06T 7/246* (2017.01)
  *G06T 7/564* (2017.01)
  *G06T 7/12* (2017.01)
  *G06T 7/13* (2017.01)
  *G06T 7/174* (2017.01)

(52) U.S. Cl.
  CPC .............. *G06T 7/251* (2017.01); *G06T 7/564* (2017.01); *H04N 19/157* (2014.11); *G06T 2207/10021* (2013.01); *G06T 2207/30196* (2013.01)

(56) References Cited

U.S. PATENT DOCUMENTS

| | | | |
|---|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,729,471 A | 3/1998 | Jain et al. |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,084,979 A | 7/2000 | Kanade et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,003,061 B2 | 2/2006 | Wiensky |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,411,948 B2 | 4/2013 | Rother |
| 8,427,548 B2 | 4/2013 | Lim |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |

(56) References Cited

U.S. PATENT DOCUMENTS

| | | |
|---|---|---|
| 8,860,856 B2 | 10/2014 | Wetzstein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |

(56) References Cited

U.S. PATENT DOCUMENTS

| | | |
|---|---|---|
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0268330 A1* | 11/2011 | Piper .............. G06K 9/6207 382/131 |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |

(56) References Cited

U.S. PATENT DOCUMENTS

| | | |
|---|---|---|
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1 | 5/2015 | Ohnishi |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0288867 A1 | 10/2015 | Kajimura |
| 2015/0304544 A1 | 10/2015 | Eguchi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029017 A1 | 1/2016 | Liang |
| 2016/0065931 A1 | 3/2016 | Konieczny |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Hernández, Carlos, Francis Schmitt, and Roberto Cipolla. "Silhouette coherence for camera calibration under circular motion." IEEE transactions on pattern analysis and machine intelligence 29.2 (2007) (Year: 2007).*

Goldlücke, Bastian. "Multi-camera reconstruction and rendering for free-viewpoint video."; Nov. 29, 2006, https://publikationen.sulb.uni-saarland.de/bitstream/20.500.11880/25923/1/Dissertation_1485 Gold_Bast_2006.pdf (Year: 2006).*

Baillard, Caroline, et al. "Automatic line matching and 3D reconstruction of buildings from multiple views." ISPRS Conference on Automatic Extraction of GIS Objects from Digital Imagery. vol. 32. 1999 (Year: 1999).*

Kurillo, Gregorij, et al. "Geometric and color calibration of multiview panoramic cameras for life-size 3D immersive video." 2013 International Conference on 3D Vision-3DV 2013. IEEE, 2013 (Year: 2013).*

U.S. Appl. No. 15/967,076, filed Apr. 30, 2018 listing Jiantao Kuang et al. as inventors, entitled "Automatic Lens Flare Detection and Correction for Light-Field Images".

U.S. Appl. No. 15/666,298, filed Aug. 1, 2017 listing Yonggang Ha et al. as inventors, entitled "Focal Reducer With Controlled Optical Properties for Interchangeable Lens Light-Field Camera".

U.S. Appl. No. 15/590,808, filed May 9, 2017 listing Alex Song et al. as inventors, entitled "Adaptive Control for Immersive Experience Delivery".

U.S. Appl. No. 15/864,938, filed Jan. 8, 2018 listing Jon Karafin et al. as inentors, entitled "Motion Blur for Light-Field Images".

U.S. Appl. No. 15/703,553, filed Sep. 13, 2017 listing Jon Karafin et al. as inventors, entitled "4D Camera Tracking and Optical Stabilization".

U.S. Appl. No. 15/590,841, filed May 9, 2017 listing Kurt Akeley et al. as inventors, entitled "Vantage Generation and Interactive Playback".

U.S. Appl. No. 15/590,951, filed May 9, 2017 listing Alex Song et al. as inventors, entitled "Wedge-Based Light-Field Video Capture".

U.S. Appl. No. 15/944,551, filed Apr. 3, 2018 listing Zejing Wang et al. as inventors, entitled "Generating Dolly Zoom Effect Using Light Field Image Data".

U.S. Appl. No. 15/874,723, filed Jan. 18, 2018 listing Mark Weir et al. as inventors, entitled "Multi-Camera Navigation Interface".

U.S. Appl. No. 15/897,994, filed Feb. 15, 2018 listing Trevor Carothers et al. as inventors, entitled "Generation of Virtual Reality With 6 Degrees of Freesom From Limited Viewer Data".

U.S. Appl. No. 15/605,037, filed May 25, 2017 listing Zejing Wang et al. as inventors, entitled "Multi-View Back-Projection to a Light-Field".

U.S. Appl. No. 15/897,836, filed Feb. 15, 2018 listing Francois Bleibel et al. as inventors, entitled "Multi-View Contour Tracking".

U.S. Appl. No. 15/897,942, filed Feb. 15, 2018 listing Francois Bleibel et al. as inventors, entitled "Multi-View Contour Tracking With Grabcut".

Adelsberger, R. et al., "Spatially Adaptive Photographic Flash," ETH Zurich, Department of Computer Science, Technical Report 612, 2008, pp. 1-12.

(56) References Cited

OTHER PUBLICATIONS

Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et aL, "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.

Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.

(56) References Cited

OTHER PUBLICATIONS

Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Meng, J. et al., "An Approach on Hardware Design for Computational Photography Applications Based on Light Field Refocusing Algorithm," Nov. 18, 2007, 12 pages.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., " A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.

(56) References Cited

OTHER PUBLICATIONS

Kautz, J., et al., "Fast arbitrary BRDF shading for low-frequency lighting using spherical harmonics", in Eurographic Rendering Workshop 2002, 291-296.

Koltun, et al., "Virtual Occluders: An Efficient Interediate PVS Representation", Rendering Techniques 2000: Proc. 11th Eurographics Workshop Rendering, pp. 59-70, Jun. 2000.

Kopf, J., et al., Deep Photo: Model-Based Photograph Enhancement and Viewing, SIGGRAPH Asia 2008.

Lehtinen, J., et al. "Matrix radiance transfer", in Symposium on Interactive 3D Graphics, 59-64, 2003.

Lesser, Michael, "Back-Side Illumination", 2009.

Levin, A., et al., "Image and Depth from a Conventional Camera with a Coded Aperture", SIGGRAPH 2007, pp. 1-9.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Levoy, M. "Light Field Photography and Videography," Oct. 18, 2005.

Levoy, M. "Stanford Light Field Microscope Project," 2008; http://graphics.stanford.edu/projects/lfmicroscope/, 4 pages.

Levoy, M., "Autofocus: Contrast Detection", http://graphics.stanford.edu/courses/cs178/applets/autofocusPD.html, pp. 1-3, 2010.

Levoy, M., "Autofocus: Phase Detection", http://graphics.stanford.edu/courses/cs178/applets/autofocusPD.html, pp. 1-3, 2010.

Levoy, M., et al., "Light Field Microscopy," ACM Transactions on Graphics, vol. 25, No. 3, Proceedings SIGGRAPH 2006.

Liang, Chia-Kai, et al., "Programmable Aperture Photography: Multiplexed Light Field Acquisition", ACM SIGGRAPH, 2008.

Lippmann, "Reversible Prints", Communication at the French Society of Physics, Journal of Physics, 7 , Mar. 4, 1908, pp. 821-825.

Lumsdaine et al., "Full Resolution Lightfield Rendering" Adobe Technical Report Jan. 2008, pp. 1-12.

Maeda, Y. et al., "A CMOS Image Sensor with Pseudorandom Pixel Placement for Clear Imaging," 2009 International Symposium on Intelligent Signal Processing and Communication Systems, Dec. 2009.

Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.

Mallat, Stephane, "A Wavelet Tour of Signal Processing", Academic Press 1998.

Malzbender, et al., "Polynomial Texture Maps", Proceedings SIGGRAPH 2001.

Marshall, Richard J. et al., "Improving Depth Estimation from a Plenoptic Camera by Patterned Illumination," Proc. of SPIE, vol. 9528, 2015, pp. 1-6.

Masselus, Vincent, et al., "Relighting with 4D Incident Light Fields", SIGGRAPH 2003.

Meynants, G., et al., "Pixel Binning in CMOS Image Sensors," Frontiers in Electronic Imaging Conference, 2009.

Moreno-Noguer, F. et al., "Active Refocusing of Images and Videos," ACM Transactions on Graphics, Aug. 2007; pp. 1-9.

Munkberg, J. et al., "Layered Reconstruction for Defocus and Motion Blur" EGSR 2014, pp. 1-12.

Naemura et al., "3-D Computer Graphics based on Integral Photography" Optics Express, Feb. 12, 2001 vol. 8, No. 2, pp. 255-262.

Nakamura, J., "Image Sensors and Signal Processing for Digital Still Cameras" (Optical Science and Engineering), 2005.

National Instruments, "Anatomy of a Camera," pp. 1-5, Sep. 6, 2006.

Nayar, Shree, et al., "Shape from Focus", IEEE Transactions on Pattern Analysis and Machine Intelligence, vol. 16, No. 8, pp. 824-831, Aug. 1994.

Ng, R., et al. "Light Field Photography with a Hand-held Plenoptic Camera," Stanford Technical Report, CSTR 2005-2, 2005.

Ng, R., et al., "All-Frequency Shadows Using Non-linear Wavelet Lighting Approximation. ACM Transactions on Graphics," ACM Transactions on Graphics; Proceedings of SIGGRAPH 2003.

Ng, R., et al., "Triple Product Wavelet Integrals for All-Frequency Relighting", ACM Transactions on Graphics (Proceedings of SIGGRAPH 2004).

Ng, Yi-Ren, "Digital Light Field Photography," Doctoral Thesis, Standford University, Jun. 2006; 203 pages.

Ng., R., "Fourier Slice Photography," ACM Transactions on Graphics, Proceedings of SIGGRAPH 2005, vol. 24, No. 3, 2005, pp. 735-744.

Nguyen, Hubert. "Practical Post-Process Depth of Field." GPU Gems 3. Upper Saddle River, NJ: Addison-Wesley, 2008.

\* cited by examiner

MULTI-VIEW ROTOSCOPE CONTOUR PROPAGATION

CROSS-REFERENCE TO RELATED APPLICATIONS

The present application claims the benefit of U.S. Provisional Application Ser. No. 62/430,048 for "Multi-View Rotoscope Contour Propagation", filed Dec. 5, 2016, the disclosure of which is incorporated herein by reference in its entirety.

The present application is also related to U.S. application Ser. No. 15/590,877 for "Spatial Random Access Enabled Video System with a Three-Dimensional Viewing Volume", filed May 9, 2017, the disclosure of which is incorporated herein by reference in its entirety.

The present application is also related to U.S. application Ser. No. 15/582,237 for "Image Capture for Virtual Reality Displays", filed Apr. 28, 2017, the disclosure of which is incorporated herein by reference in its entirety.

The present application is also related to U.S. application Ser. No. 15/605,037 for "Multi-View Back Projection to a Light-Field", filed May 25, 2017, the disclosure of which is incorporated herein by reference in its entirety.

TECHNICAL FIELD

The present document relates to improved techniques for propagating contours, such as rotoscope contours, from one view to another.

BACKGROUND

Data captured for applications such as virtual reality often include hundreds (or more) camera views for each time frame. Rotoscoping, a post-production technique that traditionally involves hand-drawing shapes to match each individual view, does not scale well to multi-view video streams because with traditional techniques, such scaling would generally require the manual generation of the rotoscope contour for each view. With the high number of views involved in a virtual reality or augmented reality video stream, it is not generally feasible for artists to handdraw the contours for each view from scratch.

Simply adding a constant offset to a rotoscope in one view to generate a corresponding rotoscope in another view may work well for distant objects. However, for high parallax regions (such as close objects viewed with stereoscopic cues), such a technique does not work well due to significant changes in the object silhouette from one view to another. Accordingly, known rotoscoping techniques are generally too labor-intensive to be used for multi-view video.

SUMMARY

In some embodiments, a method for processing a video stream may be provided. At an image capture device, a video stream may be captured. The video stream may have a plurality of frames including at least a first frame and a second frame. Each of the frames may have a plurality of views obtained from viewpoints that are offset from each other. From a data store, a source contour, associated with a source view of the first frame, may be retrieved. From a data store, camera parameters, associated with the image capture device, may be retrieved. The camera parameters may include a first offset between the source view and a destination view of the first frame. At a processor, at least the first offset may be used to project the source contour to the destination view to generate a destination contour associated with the destination view.

The source contour may include a first closed shape defining a first interior within the first closed shape and a first exterior outside the first closed shape. The destination contour may include a second closed shape defining a second interior within the second closed shape and a second exterior outside the second closed shape. The method may further include applying an image processing technique to the source view such that the image processing technique is applied differently to the first interior than to the first exterior, and applying the image processing technique to the destination view such that the image processing technique is applied differently to the second interior than to the second exterior.

The method may further include, at an input device, receiving user input designating the source contour. Further, the method may include, at the input device, receiving second user input modifying the destination contour.

The camera parameters may further include a plurality of additional offsets between the source view and a plurality of additional destination views of the first frame. The method may further include, at the processor, using at least the additional offsets to project the source contour to each of the additional destination views to generate a plurality of additional destination contours, each of which is associated with one of the additional destination views.

Using at least the first offset to project the source contour to the destination view may include, for each source point of a plurality of source points on the source contour, designating a source window of the source view containing the source point, identifying one or more source features of the source view within the source window, using the first offset to designate a destination window of the destination view that is believed to contain a destination point on the destination contour, the destination point corresponding to the source point, identifying one or more destination features, corresponding to the source features, within the destination window, and using the destination features to locate the destination point within the destination window.

Identifying the source features and identifying the destination features may include applying at least one image analysis technique selected from the group consisting of photometric matching, gradient magnitude analysis, foreground/background modeling, and shape consistency/connectedness analysis.

Identifying the source features and identifying the destination features may include assessing one or more metrics selected from the group consisting of a photometric similarity score, an object segmentation score, and a snap-to-edge score. Assessing one or more of the metrics may include assessing a plurality of the metrics. Identifying the source features and identifying the destination features may further include computing a weighted average of the metrics and using the weighted average of the metrics to determine that the destination features are similar to the source features.

Capturing the video stream may include capturing source depth information indicative of depths of objects in the source view, and capturing destination depth information indicative of depths of objects in the destination view. Using at least the first offset to project the source contour to the destination view may include further using the source depth information and the destination depth information to project the source contour to the destination view. Using the source depth information and the destination depth information to project the source contour to the destination view may include using the source depth information for the source point to un-project the source point from 2D space to 3D space, and using the destination depth information to re-project the source point back to the destination view as the destination point.

The image capture device may be a tiled camera array with a plurality of cameras, each of which captures one of the views of the first frame. The method may further include calibrating the image capture device to obtain the camera parameters. The camera parameters may include a plurality of 3D transformations usable to transform a first position and/or orientation of each of the cameras to a second position and/or orientation of any other of the cameras. The 3D transformations may include an epipolar line that provides a 1D line across the destination view, corresponding to the source view.

The method may further include, from the data store, retrieving one or more additional source contours, each of which is associated with one of one or more additional source views of the first frame. The camera parameters may further include one or more additional offsets between the one or more additional source views and the destination view. Using at least the first offset to project the source contour to the destination view may further include using the one or more additional offsets to generate the destination contour.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

Figure 1:
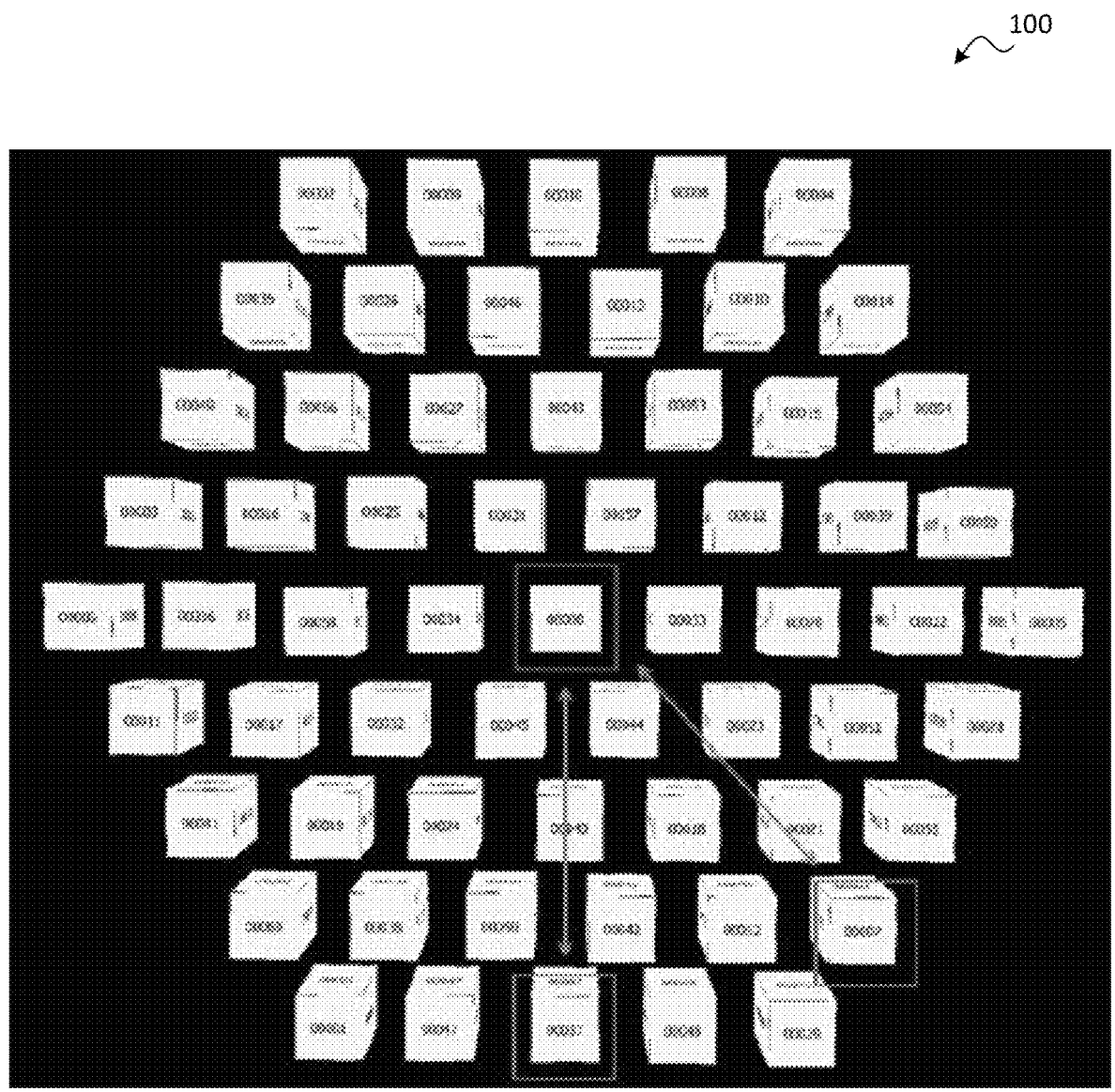
FIG. 1 is a schematic view depicting the views of one frame of a video stream, according to one embodiment.

Multiple methods are described for propagating contours, such as those used in rotoscoping or similar procedures, through the views of a multi-view video stream. Such propagation may facilitate the performance of post-processing techniques, such as replacement of foreground, background, and/or other elements in the scene.

Definitions

For purposes of the description provided herein, the following definitions are used:

| | |
|---|---|
| Light-field image | The four-dimensional sample representing the information carried by the ray bundles of light depicting an environment. Each ray may be indexed by a standard four-dimensional coordinate system. |
| Light-field volume | In this document, a light-field volume is the combination of all images captured into a single data set. A light-field volume may be fully or sparsely sampled. |
| Capture system | In this document, the term "capture system" refers to any system usable for capturing a volume for use in a virtual reality system. One example of a capture system is an array of cameras used to capture a light-field volume. A camera system is one type of capture system. A light-field camera is one type of camera system, and may be a light-field camera such as a plenoptic light-field camera or a tiled camera array (a "tiled camera array"). A tiered camera array is one type of tiled camera array. |
| Light-field camera | A device that can capture a light-field image. |
| Plenoptic light-field camera | A specific implementation of a light-field camera. This is a microlens-based approach where a plenoptic microlens array is inserted between the objective lens and the photosensor. |
| Plenoptic microlens array | A microlens array in a plenoptic camera that is used to capture the directional information. Each microlens in the array may create an image of the aperture stop of the objective lens on the surface of the sensor. |
| Tiled camera array | A specific implementation of a light-field camera. This implementation contains an array of objective lenses with overlapping fields-of-view and one or more photosensors. Each viewpoint, with one corresponding to each lens in the objective lens array, in a tiled camera array is captured as a separate image. A tiled camera array is one type of multi-view capture system. |
| Virtual reality (VR) | An immersive viewing experience, typically delivered by a VR headset or other device. |
| Viewing volume | A volume in three-dimensional space for which the data exists to render virtual views. A viewing volume may have any shape. |
| Augmented reality (AR) | An immersive viewing experience that includes a combination of virtual reality elements with real-world surroundings and objects, typically delivered by an AR headset or other device. |
| Stereo virtual reality | An extended form of virtual reality in which each eye is shown a different view of the virtual world, enabling stereoscopic 3D perception. |
| Video stream | Video data that can be used to generate one or more views of a scene for display for a viewer. |
| Mutli-view video stream | A video stream including data from multiple simultaneous viewpoints. |
| Frame | A subset of a video stream pertaining to a single point in time. |
| View | The subset of a multi-view video stream pertaining to a single viewpoint. |
| Contour | A two-dimensional shape defined by a pathway comprising one or more rectilinear and/or curvilinear segments. |
| Data store | One or more devices that store data temporarily or on a lasting basis, in volatile and/or nonvolatile form. |
| Input device | Any device that captures user input. |
| Processor | Any device capable of processing information in digital form. |
| Closed shape | A contour in which the beginning of the pathway is co-located with its end such that the pathway defines an interior and an exterior. |
| Camera parameters | Parameters pertinent to the configuration and/or operation of an image capture system. |

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images and/or video are described. One skilled in the art will recognize that these various techniques and methods can be performed on images and on video (generalized herein as "video data," or in the light-field context, "light-field video data"). Further, the techniques and methods presented herein may be used in connection with a wide variety of camera types. Even though several examples utilize a tiled camera array, one of skill in the art will recognize how the described methods and techniques could be applied to other types of light-field cameras, such as plenoptic light-field cameras.

Overview

According to some embodiments, a source contour may be obtained for one view of a frame, for example, via user input. The calibration data for the image capture device used to capture the video stream may be used to automatically propagate the source contour to one or more destination views. The calibration data may be light-field calibration data indicative of the geometry of the cameras of a tiled camera array. The source and destination contours may then be used to carry out image processing that is differentially applied to the interiors, versus the exteriors, of the contours.

FIG. 1 is a schematic view 100 depicting the views of one frame of a video stream, according to one embodiment. Specifically, FIG. 1 depicts an example in which a source view 00000 is denoted by a red square, and other desired views (such as 00007 and 00037, for example) are denoted by green squares. These views may represent different views as captured via a multi-camera capture rig or other apparatus, as described in U.S. patent application Ser. Nos. 15/582,237 and 15/590,877, both of which are incorporated herein by reference.

A contour transfer solver may be implemented in software and/or hardware, and may be executed by a post-processing system, such as the post-processing system 300 of FIG. 3 of U.S. patent application Ser. No. 15/605,037, which is incorporated herein by reference. For example, the contour transfer solver may run on the post-processing circuitry 204 of the post-processing system 300.

The solver may take into account the relative camera geometry between a reference camera view (a "source view" such as view 00000 of FIG. 1) and any of the other views ("destination views"). In at least one embodiment, the solver takes as input a source contour, such as a rotoscope contour, in the source view, learns foreground and background color models, and uses calibrated epipolar camera geometry to produce an initial rotoscope contour (a "destination contour") for each of the destination views. In some embodiments, the source contour may be propagated to all other views; thus, all of the other views may be destination views.

The resulting destination contours may optionally be exported in an artist-friendly editable format to facilitate manual modification by a user. In the alternative, the destination contours may be used for image processing without manual modification.

Figure 2A:
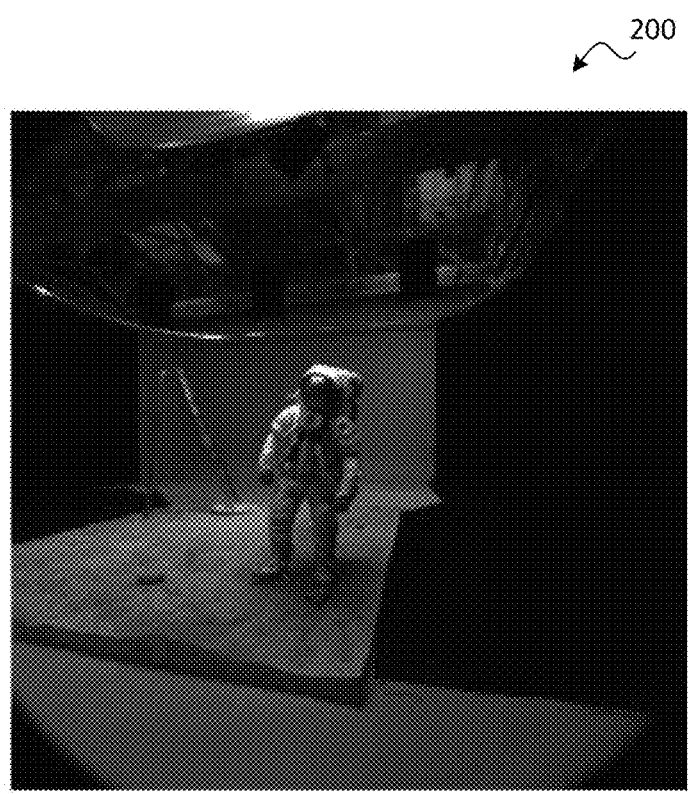
FIGS. 2A and 2B are screenshot diagrams depicting a source view (the view 00000 of FIG. 1) and a first destination view (the view 00007 of FIG. 1), respectively, according to one embodiment.
Figure 2B:
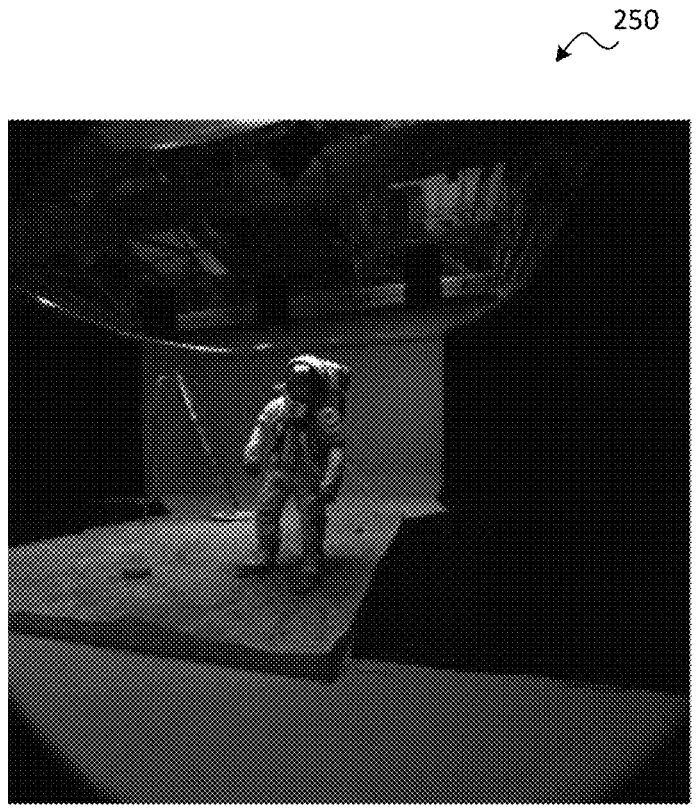

FIGS. 2A and 2B are screenshot diagrams depicting a source view 200 (the view 00000 of FIG. 1) and a first destination view 250 (the view 00007 of FIG. 1), respectively, according to one embodiment. Notably, the source view 200 and the first destination view 250 depict the scene from viewpoints that are slightly offset from each other, causing the two views to be slightly different. If the video stream was captured by a tiled camera array, as in U.S. patent application Ser. No. 15/582,237 or 15/590,877, the source view 200 and the first destination view 250 may have been captured by different cameras, and the offset between them may be a result of the displacement between the two cameras in the tiled camera array. If the video stream was captured by a plenoptic light-field camera, as in U.S. patent application Ser. No. 15/605,037, the source view 200 and the first destination view 250 may have been captured by a single image sensor, through different microlenses of a microlens array, and the offset between them may be a result of the displacement between the microlenses.

Figure 3A:
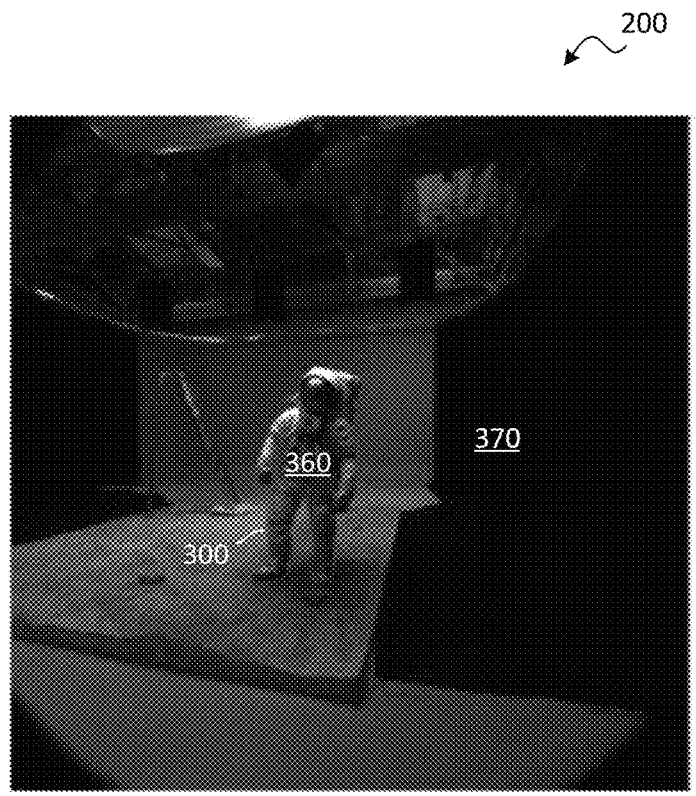
FIGS. 3A and 3B are screenshot diagrams depicting the source view and the first destination view of FIGS. 2A and 2B, respectively, with a source contour drawn in the source view and propagated to the first destination view, according to one embodiment.
Figure 3B:
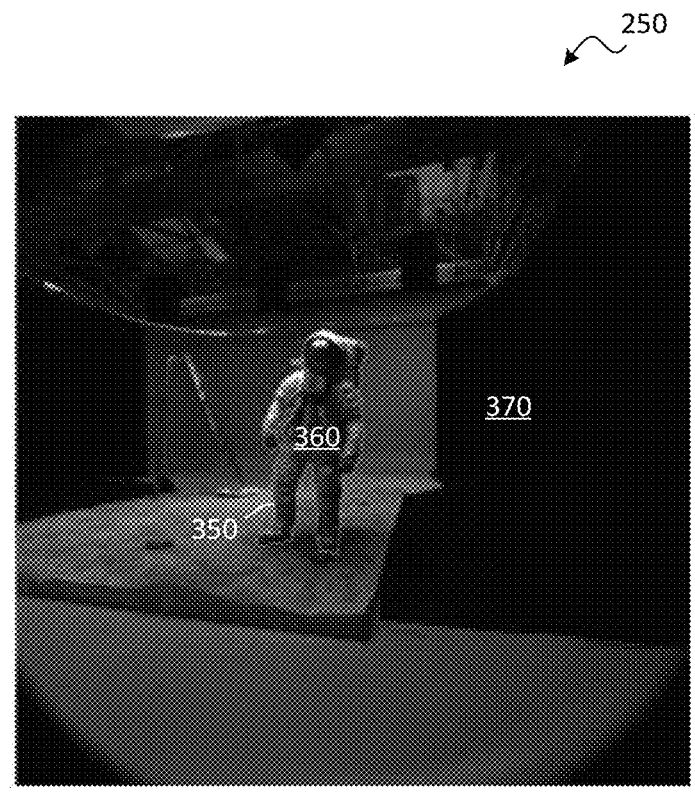

FIGS. 3A and 3B are screenshot diagrams depicting the source view 200 and the first destination view 250 of FIGS. 2A and 2B, respectively, with a source contour 300 drawn in the source view 200 and propagated to the first destination view 250, according to one embodiment. This may result in the generation of a destination contour 350 in the first destination view 250.

The destination contour 350 may correspond relatively closely to the source contour 300, as both contours designate an interior 360 containing the astronaut, and an exterior 370 surrounding the astronaut. The source contour 300 and the destination contour 350 may be used to apply a post-processing technique to the source view 200 and the first destination view, with differential application between the interior 360 and the exterior 370.

In some embodiments, this may entail applying the post-processing technique only to the interior 360 or only to the exterior 370. For example, the interior 360 may be replaced with an alternative interior (not shown—such as a computer-generated or separately-filmed astronaut), or the exterior 370 may be replaced with an alternative exterior (not shown—such a computer-generated or separately-filmed environment).

In alternative embodiments, the post-processing technique may be applied with different settings to the interior 360 than those with which it is applied to the exterior 370. For example, if lighting were to be added to the scene to simulate another light source near the astronaut, the lighting may be added in post-processing with greater application to the interior 360 than to the exterior.

Those of skill in the art will recognize that the foregoing are merely exemplary post-processing procedures; a wide variety of post-processing techniques may be used. Such techniques may be differentially applied to the interior 360 and the exterior 370 according to a wide variety of application methods, to accomplish a wide variety of results.

Notably, the destination contour 350 is not identical to the source contour 300. The destination contour 350 is shifted, vertically and laterally, relative to the source contour 300. Further, since the cameras (or microlenses) pertaining to the source view 200 and the first destination view 250 are viewing the astronaut from slightly different viewpoints, the orientation of the astronaut differs slightly between the source view 200 and the first destination view 250.

Thus, simply shifting the source contour 300 vertically and horizontally would not obtain an accurate version of the destination contour 350, because the destination contour 350 has a shape that is slightly different from that of the source contour 300. This difference is greater for objects that are closer to the image capture device. Thus, accurate propagation of the source contour 300 to the destination contour 350 may generally require that the destination contour 350 be re-drawn, as will be described subsequently.

Figure 4A:
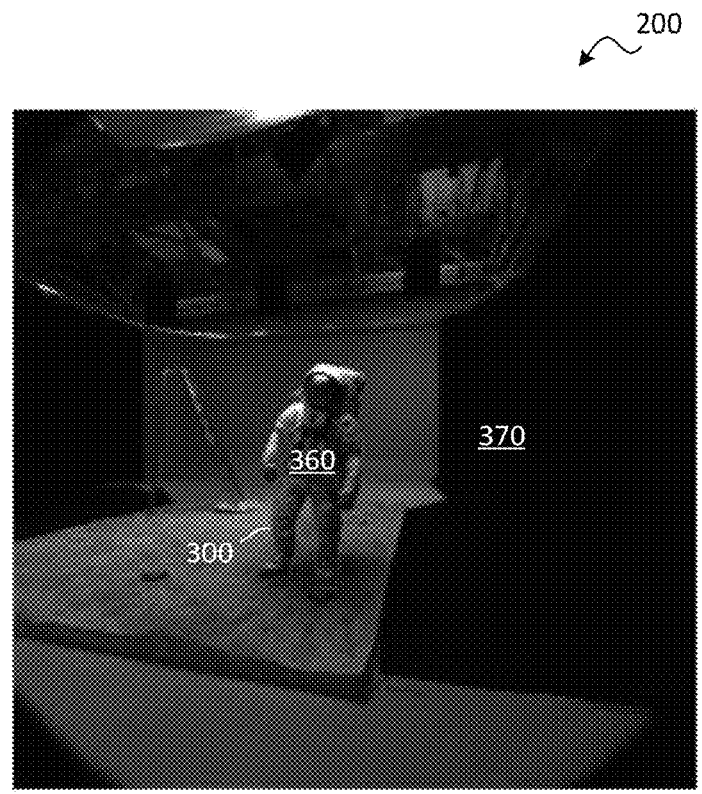
FIGS. 4A and 4B are screenshot diagrams depicting the source view of FIG. 2A and a second destination view (the view 00037 of FIG. 1), respectively, with a source contour drawn in the source view and propagated to the second destination view, according to one embodiment.
Figure 4B:
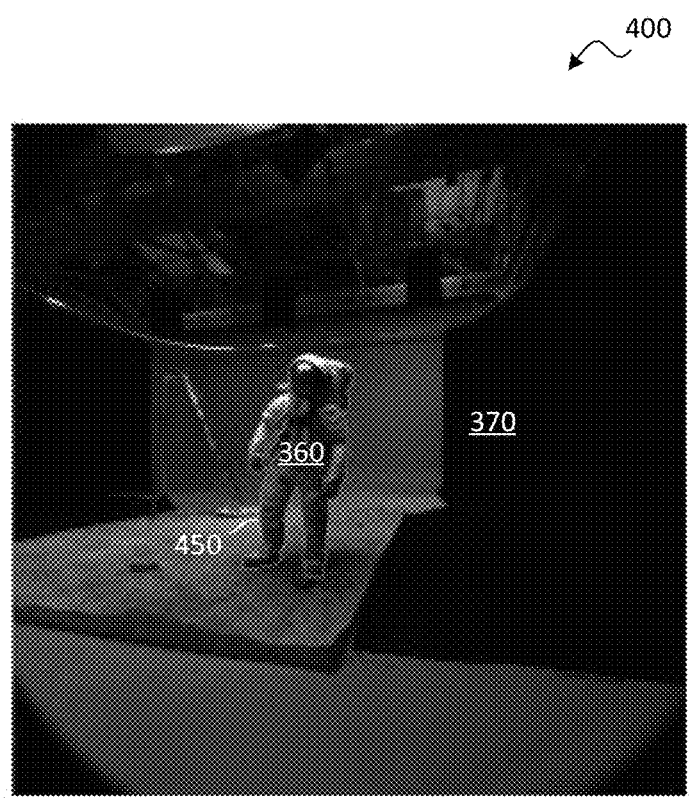

FIGS. 4A and 4B are screenshot diagrams depicting the source view 200 of FIG. 2A and a second destination view 400 (the view 00037 of FIG. 1), respectively, with the source contour 300 drawn in the source view 200 and propagated to the second destination view 400, according to one embodiment. Propagation of the source contour 300 to the second destination view 400 may lead to the generation of a destination contour 450 in the second destination view 400.

As shown, the destination contour 450 may also separate the astronaut from the surrounding environment, leading to the designation of the interior 360 and the exterior 370 in the second destination view 400. As in the first destination view 250, the fact that the astronaut is oriented slightly differently in the source view 200 and in the second destination view 400 may mean that the destination contour 450 needs to be re-drawn for the second destination view 400, based on the source contour 300.

Method of Propagating Contours

Contours may be propagated between views in a multi-view video stream according to various methods, one example of which will be shown and described in connection with FIG. 5. Such propagation may be carried out through the use of various hardware elements. Some examples are depicted in the post-processing system 300 described in U.S. application Ser. No. 15/605,037, as mentioned above.

For example, in some embodiments, the post-processing circuitry 204, memory 211, user input 215, user interface 305, and display screen 216 of the post-processing system 300 of FIG. 3 of U.S. application Ser. No. 15/605,037 may be used to implement the steps of a method of propagating contours between views of a multi-view video stream. In some embodiments, these hardware elements may be supplemented or replaced by other elements, within the understanding of a person skilled in the art.

Figure 5:
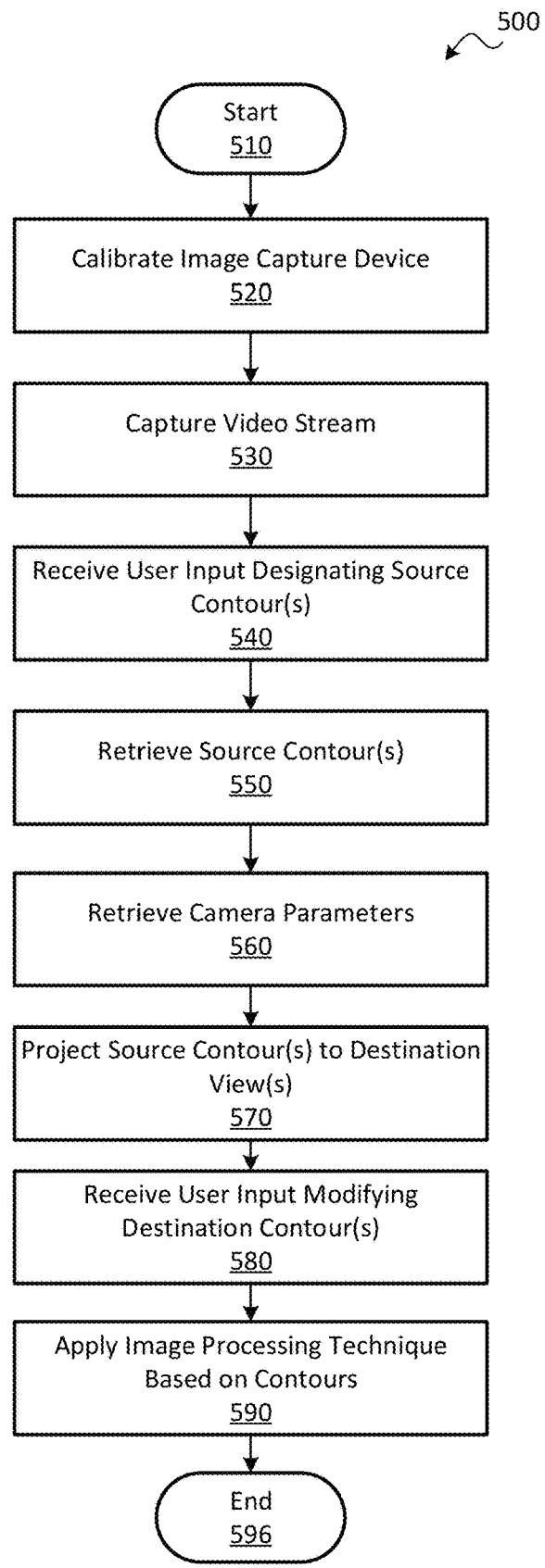
FIG. 5 is a flow diagram depicting a method for processing a video stream, according to one embodiment.

FIG. 5 is a flow diagram depicting a method 500 for processing a video stream, according to one embodiment. The method 500 may start 510 with a step 520 in which an image capture device is calibrated. The image capture device may be designed to capture light-field data. Thus, the image capture device may be a tiled camera array or a plenoptic light-field camera.

Calibration may entail collecting information regarding the parameters of the image capture device ("camera parameters"), such as the offsets (in terms of translation and/or rotation) between each pair of cameras of the image capture device, wherein the image capture device is a tiled camera array. In some embodiments, where the cameras are all positioned on a single plane, and all of the cameras face the same direction, the offsets may simply specify the x and y coordinates by which each camera is displaced on the plane from each of the other cameras. The camera parameters may be stored in a data store, such as the memory 211 of the post-processing system 300 of U.S. application Ser. No. 15/605,037.

In a step 530, the video stream may be captured with the image capture device. The video stream may have light-field data that can be used to render a scene from any virtual viewpoint within a predetermined viewing volume. Thus, the video stream captured in the step 530 may be usable for presenting a virtual reality or augmented reality experience.

In a step 540, user input may be received to designate a source contour for a source view of a frame of the video stream. Any of a variety of input devices may be used to accomplish this, including the user input 215 of the post-processing system 300 of U.S. application Ser. No. 15/605, 037. In some embodiments, a mouse, stylus, or other pointing device may be used by an artist to draw the source contour around one or more objects appearing in the source frame. Any input method known in the rotoscoping arts may be used. The source contour may be a closed curve that defines a shape with an interior and an exterior, as depicted in FIGS. 3A through 4B.

The source contour may be stored in a data store, such as the memory 211 of the post-processing system 300 of U.S. application Ser. No. 15/605,037. In alternative embodiments, more than one source contour may be received and stored.

In a step 550, the source contour may be retrieved from the data store. In a step 560, the camera parameters, for example, obtained in the step 520, may be retrieved. These items may be retrieved, for example, from the memory 211 of the post-processing system 300 of U.S. application Ser. No. 15/605,037.

In a step 570, the source contour(s) may be projected to one or more destination views. In some embodiments, the destination view(s) may all be in the same frame of the video stream as the source view(s). For example, the destination view(s) may include all views of the frame that are not source views. In alternative embodiments, the source contour(s) may be projected to one or more destination views in different frames from the source view(s). Exemplary methods for accomplishing this will be set forth subsequently.

In a step 580, user input may optionally be received for one or more destination contours to modify the destination contours. As mentioned previously, each destination contour may be stored in a user-editable format. Thus, the artist may have the option of reviewing the destination contour for each destination frame, and then making any adjustments needed. In some implementations, the automatic propagation of the source contour(s) may be accurate enough that no user modification of the destination contour(s) is needed.

In a step 590, one or more image processing techniques may be applied to the source view(s) and destination view(s). These image processing techniques may be applied differentially to the interiors and exteriors of the source contour(s) and destination contour(s), as described above. Any of a wide variety of image processing techniques may be used, including but not limited to color adjustment, luminance adjustment, lighting adjustment, addition of computer-generated or separately filmed elements, and/or the like. The method 500 may then end 596.

Projection of Source Contour to Destination View

Figure 6:
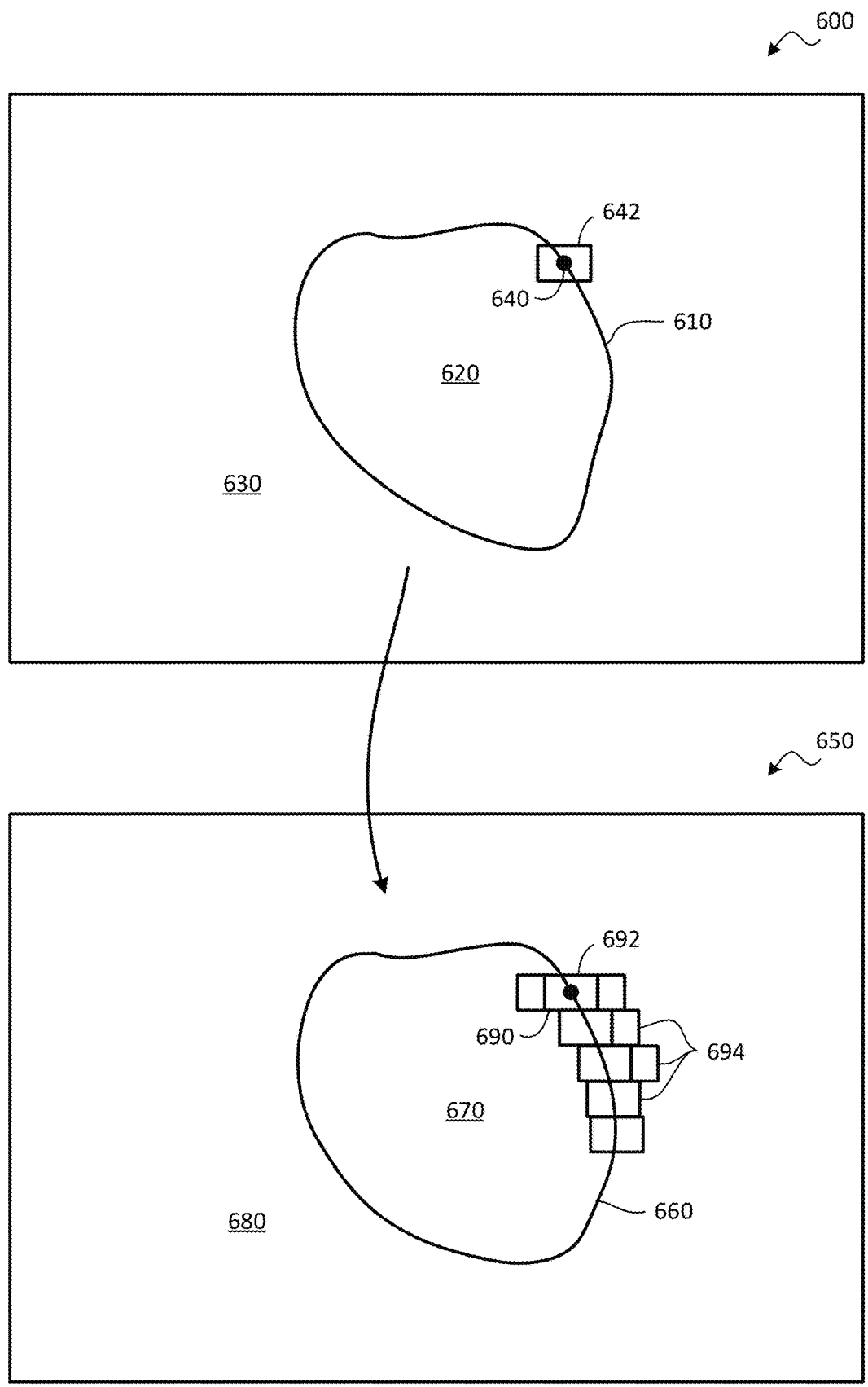
FIG. 6 is a pair of screenshot diagrams depicting propagation of the source contour in a source view to generate a destination contour in a destination view, according to one embodiment.

The step 570 of the method 500 of FIG. 5 may be carried out in various ways. According to some embodiments, points on the destination contour may be treated as unknowns to be solved. FIG. 6 depicts an example.

FIG. 6 is a pair of screenshot diagrams depicting propagation of the source contour 610 in a source view 600 to generate a destination contour 660 in a destination view 650, according to one embodiment. As shown, the source contour 610 may be a closed shape that defines an interior 620 and an exterior 630. A point 640 on the source contour 610 may reside within a window 642.

Similarly, the destination contour 660 may be a closed shape similar, but not identical, to the source contour 610. The destination contour 660 may define an interior 670 and an exterior 680. A point 690 on the destination contour 660 may reside within a window 692. The point 690 may not initially be known, but may be located by first locating the window 692. The window 692 may, for example, be located by referencing the location of the window 642 that contains the point 640 on the source contour 610. In some embodiments, multiple candidate windows 694 may be identified, and the window 692 may be selected from the candidate windows 694.

More precisely, a 2D point on the destination contour 660, such as the point 690, can be located by taking a 2D point on the source contour 610, such as the point 640, and adding to it a "depth" in a certain direction, as represented by the following equation:

$$P_{src} + d^*v = P_{dest}$$

where:
$P_{src}$ represents the 2-D point on the source curve;
$P_{dest}$ represents the 2-D point on the destination curve;
d represents a depth value; and
v represents a unit vector in a particular direction.

In at least one embodiment, the system solves for the depth and direction using stereo geometry. By knowing parameters of the calibration that defines relative positions of cameras of the image capture device (i.e., the camera parameters), the system is able to determine a line along which the matching destination point for a particular source point lies.

In determining where along the line the destination point lies, the system may first consider a window defined around the source point (for example, the window 642 of FIG. 6), and analyze image data within that window so as to identify a corresponding location along the line for the destination point. For example, the system can consider whether there is a gradient, indicating an edge within the image; a gradient found in the source view generally corresponds to a gradient in the destination view.

Any suitable metric, or set of metrics, can be used to identify the destination point based on analysis of the source point. Examples include, but are not limited to:

Photometric matching, or color similarity: This can be determined, for example, by calculating a sum of square differences (SSD), normalized cross-correlation (NCC), and/or rank and census transforms. See, for example, H. Hirschmuller and D. Scharstein, Evaluation of Cost Functions for Stereo Matching, in Proceeding, IEEE Computer Society Conference on Computer Vision and Pattern Recognition, June 2007.

Gradient magnitude, for example by determining a similarity score over gradient to look for match between source and destination. This metric can help to ensure that there is clear separation between foreground and background.

Foreground/background model: A probabilistic model can be used to indicate the probability that a particular pixel belongs to foreground as opposed to background.

Shape consistency/connectedness: This technique involves analyzing whether two elements are connected in the source; if so, they are more likely to be connected in the destination.

In at least one embodiment, any or all of the above metrics can be combined with each other. In at least one embodiment, weights can be assigned to the various metrics when combining them. In at least one embodiment, a user or operator can adjust the weights as desired.

In at least one embodiment, the method is made more efficient by restricting the search range for a corresponding destination point to those locations where the point is likely to be, thereby avoiding a search across the entire domain of possible locations. For example, input depth can be used to narrow the search range.

Once destination points are determined, the destination contour can be generated. In at least one embodiment, the destination contour is exported in editable form so as to allow a human user to fine tune the destination contour as desired, as in the step 580 of the method 500. In at least one embodiment, a mechanism can be provided for fitting a cubic spline curve so as to facilitate such fine-tuning.

Additionally, in at least one embodiment, a feedback loop can be introduced so that the edits made by the human user can be employed to train the model and thereby achieve improved results at each iteration. Any of a wide variety of known machine learning algorithms may be used to accomplish this.

Projection Method Details

Further details regarding performance of the step 570 of the method 500 of FIG. 5 will be provided below. Again, these details represent only certain embodiments; the step 570 may be carried out in other ways.

In some embodiments, a set of N source cameras may be defined:

$$\{S_1, S_2, \ldots, S_N\} \quad (1)$$

The corresponding 2-D images captured by these cameras may be described as follows:

$$\{I_1, I_2, \ldots, I_N\} \quad (2)$$

The imaging process of any camera Si may correspond to a predefined camera model. For example, a pinhole camera equation is:

$$x_i = K_i[R|t]_i X_w \quad (3)$$

where
$x_i$: a 2-D pixel location in $I_i$t
$K_i$: the intrinsic matrix of $S_i$
$[R|t]_i$: rotation and translation converting world space to the camera space centered at $S_i$
$X_w$: a 3-D point in the world space A contour of length M may be defined as a closed sequence of neighboring points on any image $I_j$:

$$C_j = \{x_{j,1}, x_{j,2}, \ldots, x_{j,M} | \forall k > 1, x_{j,k} \in nbd(x_{j,k-1})\} \quad (4)$$

A contour may be a closed curve, with $x_{j,1} \in nbd(x_{j,M})$. The function nbd(•) can denote a 4-pixel or 8-pixel neighborhood in image space, or it can be any other size if desired.

In at least one embodiment, the system solves the contour transfer problem by generating an unknown contour $C_u$ given one or more contours $\{C_1, C_2, \ldots, C_L\}$ as input, where u is different from all of the input camera indices $\{1, 2, \ldots, L\}$.

Figure 7:
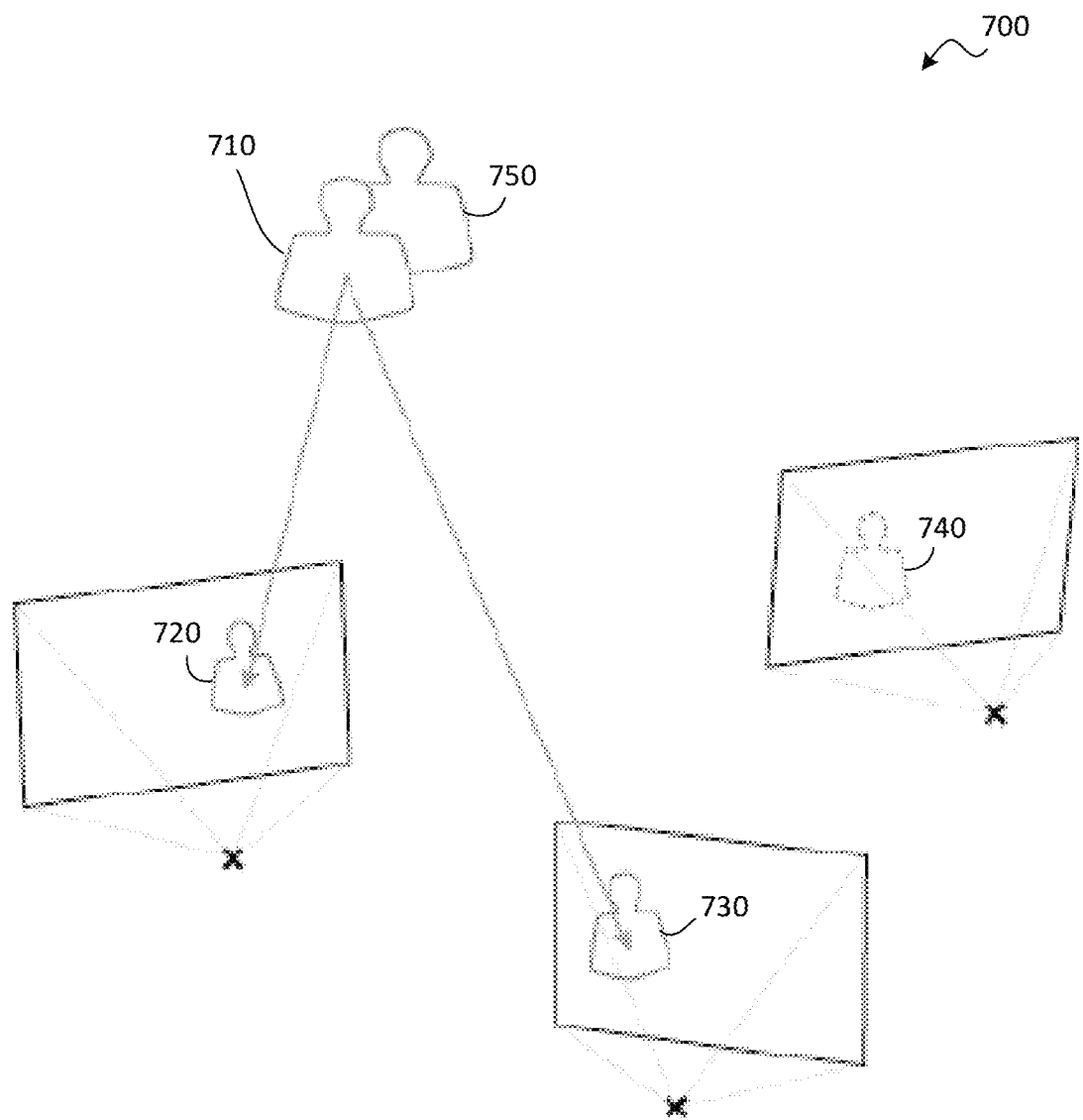
FIG. 7 is a schematic diagram depicting multi-view capture, rotoscoping, and contour propagation, according to one embodiment.

FIG. 7 is a schematic diagram 700 depicting multi-view capture, rotoscoping, and contour propagation, according to one embodiment. A 3D object 710 within the scene may be of interest. A known input contour 720 may be designated $C_1$. Another known input contour 730 may be designated $C_L$.

An unknown contour 740 may be solved for via the propagation techniques set forth herein, and may be designated $C_u$. Another 3D object 750 within the scene may not be of interest, and may thus be left out of the interior of the unknown contour 740.

In at least one embodiment, the system is implemented using data from a camera rig, which may be a light-field camera rig or any other type of rig, as mentioned previously. The camera rig may have any number of cameras, which may be arranged in any suitable configuration. In at least one embodiment, the positions and orientations of the cameras in the rig may determine an inter-camera relative 3D geometry that is non-trivial. In at least one embodiment, a calibration process is used to estimate these transforms, as in the step 520 of the method 500. As further described previously, it may not be sufficient to simply apply a 2D (x, y) offset to an input contour $C_j$ to compute the unknown contour $C_u$. The unknown contour $C_u$ may have a shape that is distinct from that of the input contour $C_j$, particularly if the 3D object 710 that is of interest is near the camera rig.

Further, since view-dependent lighting effects are a function of viewing position and direction, the object 710 may appear to have slightly different color components in the view generated by each camera. In at least one embodiment, these are unified prior to analysis. For example, colors may be unified, or view-dependent lighting effects may be removed for contour propagation.

Additional challenges exist because of occlusions and visibility. Since the cameras are physically situated at different positions, each camera sees a slightly different part of the 3D object 710 of interest that is possibly not seen by other cameras.

Formulation

In at least one embodiment, based on the calibration process used to calibrate the image capture device (for example, a camera rig), estimates may be generated for 3D transforms between any pair of cameras on the rig. For a pair of cameras $S_j$ and $S_u$, this calibration may define an epipolar geometry that reduces the search space for point correspondences from two dimensions (2D) to one dimension (1D). Specifically, for a given point $X_{j,k}$ in image $I_j$, it is known that the corresponding point must lie on the epipolar line defined by $F_{u,j}x_{j,k}$, where F is known in stereo vision literature as the fundamental matrix.

Thus, an unknown point $x_{u,k}$ on the output contour $C_u$ can be defined by a line-transfer model:

$$X_{u,k} = \arg_d\{x_0 + dv\} \quad (5)$$

where $\arg_d$: denotes that we need to solve for d
$x_0$: origin of the epipolar line $F_{u,j}x_{j,k}$
v: unit direction vector of the epipolar line Thus, the contour transfer problem can be reduced to a problem of solving for epipolar arc lengths $\{d_1, d_2, \ldots, d_M\}$:

$$C_u = \{epi(x_{j,1}, d_1), epi(x_{j,2}, d_2), \ldots, epi(x_{j,M}, d_M)\}$$

The epipolar arc length may be different from what is known as disparity in stereo vision literature because usage of the epipolar arc length may not involve stereo rectification. Given a range of possible values $[d_{min}, d_{max}]$ for epipolar arc length and a fixed length M for an input contour $C_j$, each cell in the 2-D discrete table $T_j$: $[0, M] \times [d_{min}, d_{max}]$ may define a corresponding point in the desired image $I_u$.

For any pair of points $x_j$ and $x_u$ chosen as such, a set of quantitative objective functions O* may be defined, to evaluate how well they correspond. These functions can include, for example:

Photometric Similarity. A color-channel-based measure that combines values in a local window around each pixel in $I_j$ and $I_u$. Common photometric similarity methods used in literature include Sum of Squared Differences (SSD), Normalized Cross-Correlation (NCC), and the Census transform. In at least one embodiment, window size is selected to be small enough not to mix too many features together, but large enough to capture intensity variations across object edges:

$$O_{pho}(x_j, x_u) = \sum_{\delta x} CensusDiff(I_j(x_j + \delta x), I_u(x_u + \delta x))$$

Object Segmentation Score: Each closed contour curve $C_j$ may define an interior and an exterior set of pixels for its image $I_j$. A foreground-background color model may be generated from the inputs $I_j$ based on this segmentation. This probabilistic model may then be used to predict whether or not an unknown pixel $x_u$ belongs to the foreground (FG), i.e. the interior of the object-of-interest:

$$O_{seg}(x_j, x_u) = Pr(x_u \text{ in } FG|I_u(x_u))$$

Traditionally, a color model can be built using either color histograms or Gaussian Mixture Models (GMMs), each of which define their own formulae for computing the foreground probability denoted in the equation above.

Snap-to-Edge Score: To address the visibility changes in the unknown view $S_u$, in at least one embodiment, the unknown contour $C_u$ is gravitated toward image edges as measured by a gradient function:

$$O_{edg}(x_j, x_u) = \sum_{\delta x} Diff(\nabla I_j(x_j + \delta x), \nabla I_u(x_u + \delta x))$$

The correspondence cost for a pair of pixels is thus:

$$O(x_j, x_u) = w_{pho}O_{pho}(x_j, x_u) + w_{seg}O_{seg}(e_j, x_u) + w_{edg}O_{edg}(x_j, x_u)$$

For a given set of weights $\{\omega_{pho}, \omega_{seg}, \omega_{edg}\}$, and an input contour $C_j$, each cell of the table can be populated as follows: $T_j$: $[0, M] \times [d_{min}, d_{max}]$. The solution for the unknown contour may then be the closed curve of minimum accumulated cost that connects cells in table $T_j$.

Solution without Using Depth Information

In order to ensure that choices in adjacent rows of the 2D cost table actually correspond to neighboring pixels in the image $I_u$, in at least one embodiment, a constant neighborhood penalty η is imposed, where deviations from the previous choice cost increasingly more.

For example, a cost table $T_j$ can be constructed, with cells indexed as (r, c) for (row, column), where rows correspond to points on the input contour (range [0, M]) and columns correspond to the unknown epipolar arc length (range $[d_{min}, d_{max}]$). The following steps can be performed:

Compute:

$$\forall (r,c), T_j(r,c) = O(x_{j,r}, epi(x_{j,r}, c))$$

From top-to-bottom, left-to-right, compute:

$$T_j(r,c) = T_j(r,c) + \min\{T_j(r-1, c-1) + \eta, T_j(r-1, c), T_j(r-1, c+1) + \eta\}$$

Find the cell of smallest cost in the last row (row M). This may be the first solved point for $C_u$.

Backtrace the solution by going from bottom-to-top in the table, at each step selecting the cell of minimum cost. Substituting the column that yields this minimum value in each row back into the epipolar equation may yield the remaining points for $C_u$.

Figure 8A:
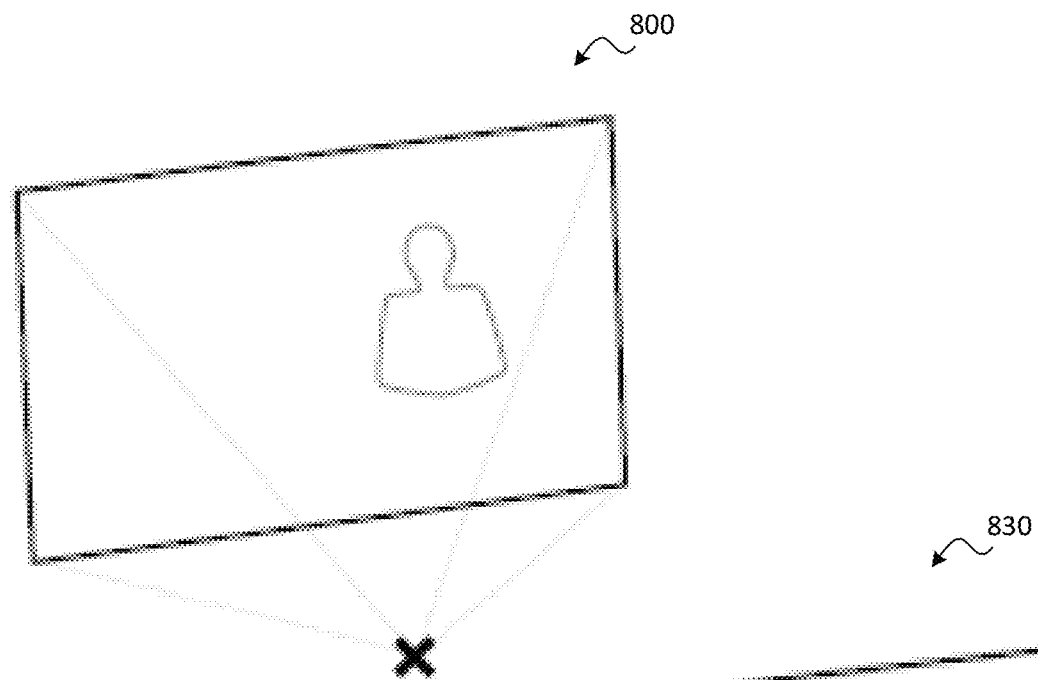
FIGS. 8A, 8B, and 8C depict an exemplary source contour in a source view, destination contour in a destination view, and cost table, respectively, according to one embodiment.
Figure 8B:
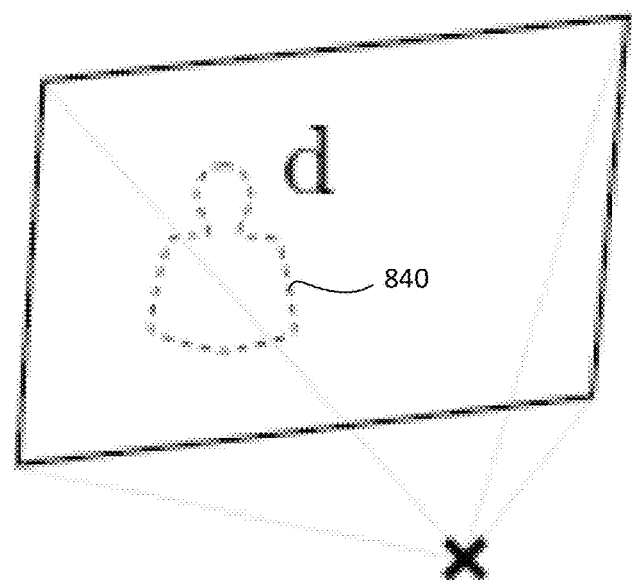
Figure 8C:
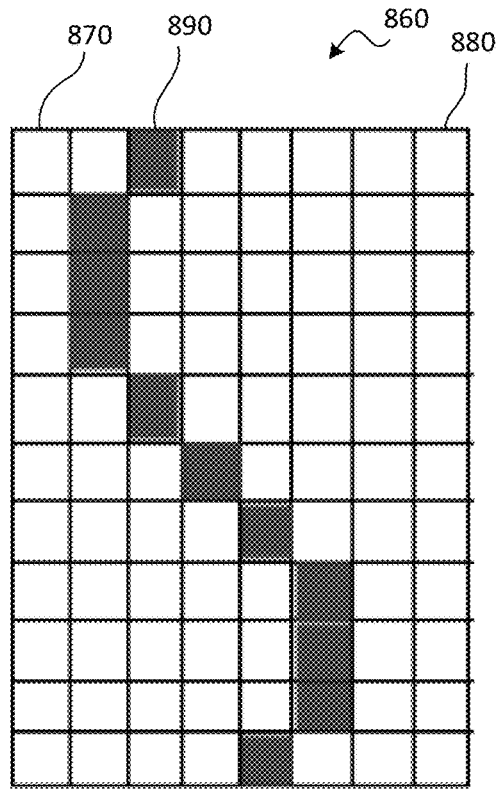

FIGS. 8A, 8B, and 8C are an exemplary source contour in a source view 800, destination contour in a destination view 830, and cost table 860, respectively, according to one embodiment. The source view 800, destination view 830, and cost table 860 of FIGS. 8A, 8B, and 8C may pertain to the example of FIG. 7.

In the cost table 860 of FIG. 8C, the left-hand column 870 corresponds to the value $d_{min}$, the right-hand column 880 corresponds to the value $d_{max}$, and the green cells 890 represent the selection of minimum cost cells from bottom-to-top. The result may be generation of a destination contour 840, designated $C_u$, in the destination view 830, from the minimum cost cells.

In at least one embodiment, the values of $d_{min}$ and $d_{max}$ may be selected so as to avoid deleterious effects. A large range could lead to spurious photometric matches from unrelated parts of the two images, whereas a small range might not be sufficient to account for the wide-baseline geometry of the cameras.

Multiple Input Contours

In some embodiments, post-production artists can provide multiple input contours. Although the above description sets forth the objective function in pairwise form, one skilled in the art will recognize that it can be extended to multiple source views via accumulation.

In one embodiment using multiple input contours, the Object Segmentation Score has a model that can be updated with the interior contours of all source views. In at least one embodiment, the Snap-to-Edge Score is defined in the output image raster space, so that it remains unchanged. In at least one embodiment, the Photometric Score is updated to accumulate the mismatch cost across all input sources. In this manner, the above-described techniques can be extended to apply to multiple source images.

Solution Using Depth Information

In at least one embodiment, the system is implemented in connection with a light-field capture rig including multiple cameras. Results derived from such a rig can include a per-pixel depth map, which indicates how far each pixel is from the camera that captured it.

In at least one embodiment, such a depth map can be used as input to the system, for example by determining appropriate column ranges for each row of the table T as follows:
Unproject the point from 2-D to 3-D camera space using the pixel location and the depth map value; and
Then reproject the point back to the desired camera image $I_u$ and search along a range of pixels around that projected point.

This method may provide robustness to minor depth estimation errors, while simultaneously picking an appropriate search space for each output pixel. Thus, solving for the contour seeded by an initial depth range, in turn, can help refine depth values.

In the case that depth values within the input contour are more reliable, the depth values in the entire interior of that contour may be used to transfer the contour mask from the source view to the destination view. This is an alternative to the epipolar solution method mentioned in the previous section.

VFX Workflow

In at least one embodiment, the aforementioned techniques and method can be re-applied when any of the input parameters change. By exposing the parameter set $\{\omega_{pho}, \omega_{seg}, \omega_{edg}, \eta\}$ as artist-selectable values, the solution can be made variably sensitive to, for example, scene lighting, color differences between cameras, or how important edge alignment is.

Further, in at least one embodiment, the output contours are rasterized to pixel level. In order for the output to be more easily editable, a spline curve can be fit to the raster curve, thereby exposing fewer control points.

Advantages

The systems and methods set forth above may provide several advantages over prior systems. These may include, but are not limited to:

Quick Bootstrapping

Rotoscope artists can draw a handful of views instead of all of them. The described system can then use those initial views as reference views, performing automated propagation of the rotoscope contour to any view of their choice. This may bootstrap their process, reducing the effort required to draw on each view from scratch.

Ability to Interface with Existing VFX Tools

The system can be implemented as a standalone back-end, and in at least one embodiment can interface with other software such as The Foundry's Nuke tool suite. This modular design may facilitate generation of new plug-ins as needed for other tools without having to redo the solver logic in the core system.

Fine-Tuning Support

In at least one embodiment, the system exports curves generated by the solver in simplified spline format. This may enable artists to edit them more easily.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CDROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for processing a video stream, the method comprising:
   at an image capture device, capturing a video stream such that the video stream comprises a plurality of frames comprising at least a first frame and a second frame, wherein each of the frames comprises a plurality of views obtained from viewpoints that are offset from each other;
   from a data store, retrieving a source contour representing a contour drawn in a source view of the first frame;
   from the data store, retrieving camera parameters associated with the image capture device, the camera parameters comprising a first offset between the source view and a destination view of the first frame; and
   at a processor, using at least the first offset to project the source contour to the destination view to generate a destination contour associated with the destination view.

2. The method of claim 1, wherein:
   the source contour comprises a first closed shape defining a first interior within the first closed shape and a first exterior outside the first closed shape; and
   the destination contour comprises a second closed shape defining a second interior within the second closed shape and a second exterior out-side the second closed shape;
   and wherein the method further comprises:
       applying an image processing technique to the source view such that the image processing technique is applied differently to the first interior than to the first exterior; and
       applying the image processing technique to the destination view such that the image processing technique is applied differently to the second interior than to the second exterior.

3. The method of claim 1, further comprising, at an input device, receiving first user input designating the source contour.

4. The method of claim 3, further comprising, at the input device, receiving second user input modifying the destination contour.

5. The method of claim 1, wherein:
   the camera parameters further comprise a plurality of additional offsets be-tween the source view and a plurality of additional destination views of the first frame; and
   the method further comprises, at the processor, using at least the additional offsets to project the source contour to each of the additional destination views to generate a plurality of additional destination contours, each of which is associated with one of the additional destination views.

6. The method of claim 1, wherein using at least the first offset to project the source contour to the destination view comprises, for each source point of a plurality of source points on the source contour:
   designating a source window of the source view containing the source point;
   identifying one or more source features of the source view within the source window;
   using the first offset to designate a destination window of the destination view that is believed to contain a destination point on the destination contour, the destination point corresponding to the source point;
   identifying one or more destination features, corresponding to the source features, within the destination window; and
   using the destination features to locate the destination point within the destination window.

7. The method of claim 6, wherein identifying the source features and identifying the destination features comprises applying at least one image analysis technique selected from the group consisting of:
   photometric matching;
   gradient magnitude analysis;
   foreground/background modeling; and
   shape consistency/connectedness analysis.

8. The method of claim 6, wherein identifying the source features and identifying the destination features comprises assessing one or more metrics selected from the group consisting of:
   a photometric similarity score;
   an object segmentation score; and
   a snap-to-edge score.

9. The method of claim 8, wherein:
   assessing one or more of the metrics comprises assessing a plurality of the metrics; and
   identifying the source features and identifying the destination features further comprises:
   computing a weighted average of the metrics; and
   using the weighted average of the metrics to determine that the destination features are similar to the source features.

10. The method of claim 6, wherein:
    capturing the video stream comprises:
    capturing source depth information indicative of depths of objects in the source view;
    capturing destination depth information indicative of depths of objects in the destination view; and
    using at least the first offset to project the source contour to the destination view comprises further using the source depth information and the destination depth information to project the source contour to the destination view.

11. The method of claim 10, wherein using the source depth information and the destination depth information to project the source contour to the destination view comprises:
    using the source depth information for the source point to un-project the source point from 2D space to 3D space; and
    using the camera parameters to re-project the source point back to the destination view as the destination point.

12. The method of claim 1, wherein:
    the image capture device comprises a tiled camera array comprising a plurality of cameras, each of which captures one of the views of the first frame; and
    the method further comprises calibrating the image capture device to obtain the camera parameters.

13. The method of claim 12, wherein the camera parameters comprise a plurality of 3D transformations usable to transform a first position and/or orientation of each of the cameras to a second position and/or orientation of any other of the cameras.

14. The method of claim 13, wherein the 3D transformations comprise an epipolar line that provides a 1D line across the destination view, corresponding to the source view.

15. The method of claim 1, wherein:
    the method further comprises, from the data store, retrieving one or more additional source contours, each of which is associated with one of one or more additional source views of the first frame;

the camera parameters further comprise one or more additional offsets between the one or more additional source views and the destination view; and using at least the first offset to project the source contour to the destination view further comprises using the one or more additional offsets to generate the destination contour.

16. A non-transitory computer-readable medium for processing a video stream, comprising instructions stored thereon, that when executed by a processor, perform the steps of:

from a data store, retrieving at least part of a video stream captured by an image capture device, the video stream comprising a plurality of frames comprising at least a first frame and a second frame, wherein each of the frames comprises a plurality of views obtained from viewpoints that are offset from each other;

from the data store, retrieving a source contour representing a contour drawn in a source view of the first frame;

from the data store, retrieving camera parameters associated with the image capture device, the camera parameters comprising a first offset between the source view and a destination view of the first frame; and using at least the first offset to project the source contour to the destination view to generate a destination contour associated with the destination view.

17. The non-transitory computer-readable medium of claim 16, wherein:

the source contour comprises a first closed shape defining a first interior within the first closed shape and a first exterior outside the first closed shape; and the destination contour comprises a second closed shape defining a second interior within the second closed shape and a second exterior outside the second closed shape;

and wherein the non-transitory computer-readable medium further comprises instructions stored thereon, that when executed by a processor, perform the steps of:

applying an image processing technique to the source view such that the image processing technique is applied differently to the first interior than to the first exterior; and applying the image processing technique to the destination view such that the image processing technique is applied differently to the second interior than to the second exterior.

18. The non-transitory computer-readable medium of claim 16, further comprising instructions stored thereon, that when executed by a processor, cause an input device to receive first user input designating the source contour.

19. The non-transitory computer-readable medium of claim 18, further comprising instructions stored thereon, that when executed by a processor, cause the input device to receive second user input modifying the destination contour.

20. The non-transitory computer-readable medium of claim 16, wherein:

the camera parameters further comprise a plurality of additional offsets between the source view and a plurality of additional destination views of the first frame; and the non-transitory computer-readable medium further comprises instructions stored thereon, that when executed by a processor, use at least the additional offsets to project the source contour to each of the additional destination views to generate a plurality of additional destination contours, each of which is associated with one of the additional destination views.

21. The non-transitory computer-readable medium of claim 16, wherein using at least the first offset to project the source contour to the destination view comprises, for each source point of a plurality of source points on the source contour:

designating a source window of the source view containing the source point;

identifying one or more source features of the source view within the source window;

using the first offset to designate a destination window of the destination view that is believed to contain a destination point on the destination contour, the destination point corresponding to the source point;

identifying one or more destination features, corresponding to the source features, within the destination window; and using the destination features to locate the destination point within the destination window.

22. The non-transitory computer-readable medium of claim 21, wherein:

capturing the video stream comprises:

capturing source depth information indicative of depths of objects in the source view;

capturing destination depth information indicative of depths of objects in the destination view; and using at least the first offset to project the source contour to the destination view comprises further using the source depth information and the destination depth information to project the source contour to the destination view by:

using the source depth information for the source point to un-project the source point from 2D space to 3D space; and using the camera parameters to re-project the source point back to the destination view as the destination point.

23. The non-transitory computer-readable medium of claim 16, wherein:

the image capture device comprises a tiled camera array comprising a plurality of cameras, each of which captures one of the views of the first frame; and the non-transitory computer-readable medium further comprises instructions stored thereon, that when executed by a processor, calibrate the image capture device to obtain the camera parameters; and the camera parameters comprise a plurality of 3D transformations usable to transform a first position and/or orientation of each of the cameras to a second position and/or orientation of any other of the cameras.

24. A system for processing a video stream, the system comprising:

a data store configured to:

store at least part of a video stream captured by an image capture device, the video stream comprising a plurality of frames comprising at least a first frame and a second frame, wherein each of the frames comprises a plurality of views obtained from viewpoints that are offset from each other;

retrieve a source contour representing a contour drawn in a source view of the first frame; and retrieve camera parameters associated with the image capture device, the camera parameters comprising a first offset between the source view and a destination view of the first frame; and a processor configured to use at least the first offset to project the source contour to the destination view to generate a destination contour associated with the destination view.

25. The system of claim 24, wherein:
the source contour comprises a first closed shape defining a first interior within the first closed shape and a first exterior outside the first closed shape; and
the destination contour comprises a second closed shape defining a second interior within the second closed shape and a second exterior out-side the second closed shape;
and wherein the processor is further configured to:
  apply an image processing technique to the source view such that the image processing technique is applied differently to the first interior than to the first exterior; and
  apply the image processing technique to the destination view such that the image processing technique is applied differently to the second interior than to the second exterior.

26. The system of claim 24, further comprising an input device configured to receive first user input designating the source contour.

27. The system of claim 26, wherein the input device is further configured to receive second user input modifying the destination contour.

28. The system of claim 24, wherein:
the camera parameters further comprise a plurality of additional offsets be-tween the source view and a plurality of additional destination views of the first frame; and
the processor is further configured to use at least the additional offsets to project the source contour to each of the additional destination views to generate a plurality of additional destination contours, each of which is associated with one of the additional destination views.

29. The system of claim 24, wherein the processor is further configured to use at least the first offset to project the source contour to the destination view by, for each source point of a plurality of source points on the source contour:
  designating a source window of the source view containing the source point;
  identifying one or more source features of the source view within the source window;
  using the first offset to designate a destination window of the destination view that is believed to contain a destination point on the destination contour, the destination point corresponding to the source point;
  identifying one or more destination features, corresponding to the source features, within the destination window; and
  using the destination features to locate the destination point within the destination window.

30. The system of claim 29, further comprising the image capture device, wherein the image capture device is configured to capture the video stream.

31. The system of claim 30, wherein:
the image capture device is further configured to capture the video stream by:
  capturing source depth information indicative of depths of objects in the source view;
  capturing destination depth information indicative of depths of objects in the destination view; and
  using at least the first offset to project the source contour to the destination view comprises further using the source depth information and the destination depth information to project the source contour to the destination view; and
the processor is further configured to use the source depth information and the destination depth information to project the source contour to the destination view by:
  using the source depth information for the source point to un-project the source point from 2D space to 3D space; and
  using the camera parameters to re-project the source point back to the destination view as the destination point.

32. The system of claim 30, wherein:
the image capture device comprises a tiled camera array comprising a plurality of cameras, each of which captures one of the views of the first frame;
the processor is further configured to calibrate the image capture device to obtain the camera parameters; and
the camera parameters comprise a plurality of 3D transformations usable to transform a first position and/or orientation of each of the cameras to a second position and/or orientation of any other of the cameras.

* * * * *